S. F. Jones,
Cage Trap,
Nº 54,361. Patented May 1, 1866.
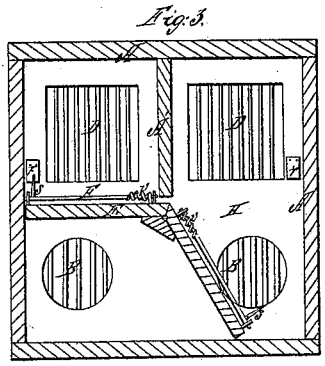
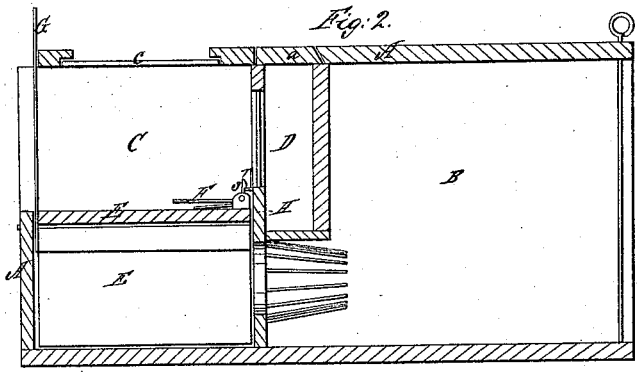
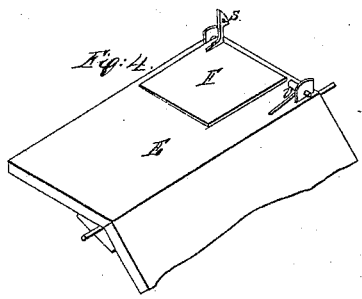
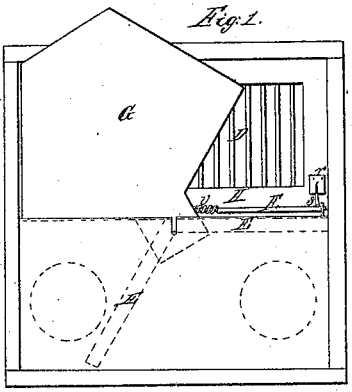
Witnesses:
D. W. Avery
C. R. Henderson
Inventor:
Samuel F. Jones

UNITED STATES PATENT OFFICE.

SAMUEL F. JONES, OF ST. PAUL, INDIANA.

IMPROVEMENT IN ANIMAL-TRAPS.

Specification forming part of Letters Patent No. 54,361, dated May 1, 1866.

*To all whom it may concern:*

Be it known that I, SAMUEL F. JONES, of St. Paul, in the county of Decatur and State of Indiana, have invented new and useful Improvements in Animal-Traps; and I do hereby declare that the following is a full and exact description thereof, reference being had to the accompanying drawings, making part of the same, in which—

Figure 1 is a front end elevation of the trap. Fig. 2 is a vertical longitudinal section. Fig. 3 is a transverse section, and Fig. 4 is a perspective view of a part of the vibrating platform E and one of the spring-treadles F, by means of which the trap is sprung.

Similar letters of reference indicate corresponding parts in the several figures.

My improvement relates to that class of animal-traps called "self-setting;" and it consists in dividing the front or entrance compartment longitudinally in two parts and arranging a vibrating platform made in two wings joined together at an angle of about sixty degrees, and which is hung on journals in the partition, and having a shutter attached to the front end in such manner as to close the entrance to one of the divisions, leaving the other open as the platform is vibrated or tipped by the animal springing the trap.

The wing of the platform in the division that is open is horizontal and ready for the entrance of the animal. The inner end of each wing of the platform is provided with a spring-treadle having a hook-catch, which, when unhooked by the animal stepping upon it to get at the bait, which is placed in a chamber immediately in the rear of the vibrating platform, allows the platform to tip, carrying the animal down with it and closing the shutter behind it. The animal, finding no means of escape but through an opening in the rear, will enter it to find itself in a cage or chamber provided for that purpose, from which it cannot escape. The animal, in the act of springing the trap and tipping the platform, as just described, sets the other side ready for the entrance of another animal, and so on alternately, each animal caught setting the trap for another.

To enable others skilled in the art to make and use my invention, I will proceed to describe it.

The construction and operation of the trap will be understood by reference to the drawings. Figs. 1 and 2 represent its form. It may be made of wood, either with or without sheet-metal lining, or of other suitable material.

A is the external case or box, which is separated into two compartments, B and C, Fig. 2. B is the cage to receive and retain the animals in the rear end, and C the front or entrance end, in which the angular vibrating platform E is arranged. The platform E is made in two wings, attached together at an angle to a perpendicular of about sixty degrees, as shown. It is more clearly represented in Fig. 4, one wing and the spring-treadle F thereto attached being shown complete and a part of the other wing with the spring-treadle left off. The platform is hung on small journals in the partition H and front plate. The compartment C is separated in two parts by a partition, A', above the vibrating platform E, as shown in Fig. 3.

G is a shutter attached to the front end of the platform, and vibrates with it. Its position in relation to the platform is shown by the dotted lines lettered E in Fig. 1, indicating the platform.

The spring-treadles F are made of sheet metal, attached to a piece of wire that forms the journals by which it is hung in bearings on the rear end of the wings of the platform E, as shown. A small hook, $s$, is fixed to the treadles F, which catches on a catch, $r$, fixed on the partition H, and serves to hold the platform in the position shown until tripped by the animal. A coiled spring, $v$, holds the treadles off the platform, and also insures the hook $s$ to catch on $r$. There is a plate of glass, $c$, in the top of compartment C, to admit light to it and also the bait-chamber D, which is located, as shown, in the rear of the compartment C. The bait is introduced into the bait-chamber D from the top by removing slide $a$. The partition in front of it has wire-covered openings, through which the animal can see and scent the bait. The rear end of cage B is filled with wire rods.

Fig. 1 represents the trap as ready for an animal to enter, the wing of the platform in the division that is open being horizontal and the hook $s$ over the catch $r$, and entrance to the other side being prevented by the shutter G. The animal, on entering, steps upon the platform E, which is prevented from sinking down under his weight by the hook $s$; but as he endeavors to get at the bait in chamber D and steps upon the treadle F it sinks down and unhooks the hook $s$ off the catch $r$, which lets the platform E tip or vibrate, letting the animal down, and at the same time closing the shutter G behind him. Having no means of escape except through the openings in partition H, below the bait-chamber D, he will pass through into the cage B, from which he is prevented from returning by the converging wires around the openings. The animal, by the act of springing the trap, as just described, raises the other wing of the platform, and the hook $s$ catches on the catch $r$, and it is ready for the entrance of another animal, and so on alternately, each animal caught setting the trap for another.

Self-setting traps are in common use, and I do not make any claim to such; but

What I do claim, and desire to secure by Letters Patent, is—

The angular vibrating platform E, treadles F, coiled springs $v$, hooks $s$, catches $r$, and shutter G, when constructed and arranged in the manner and operated for the purpose substantially as set forth.

SAMUEL F. JONES.

Witnesses:
D. W. AVERY,
C. R. HENDERSON.